UNITED STATES PATENT OFFICE.

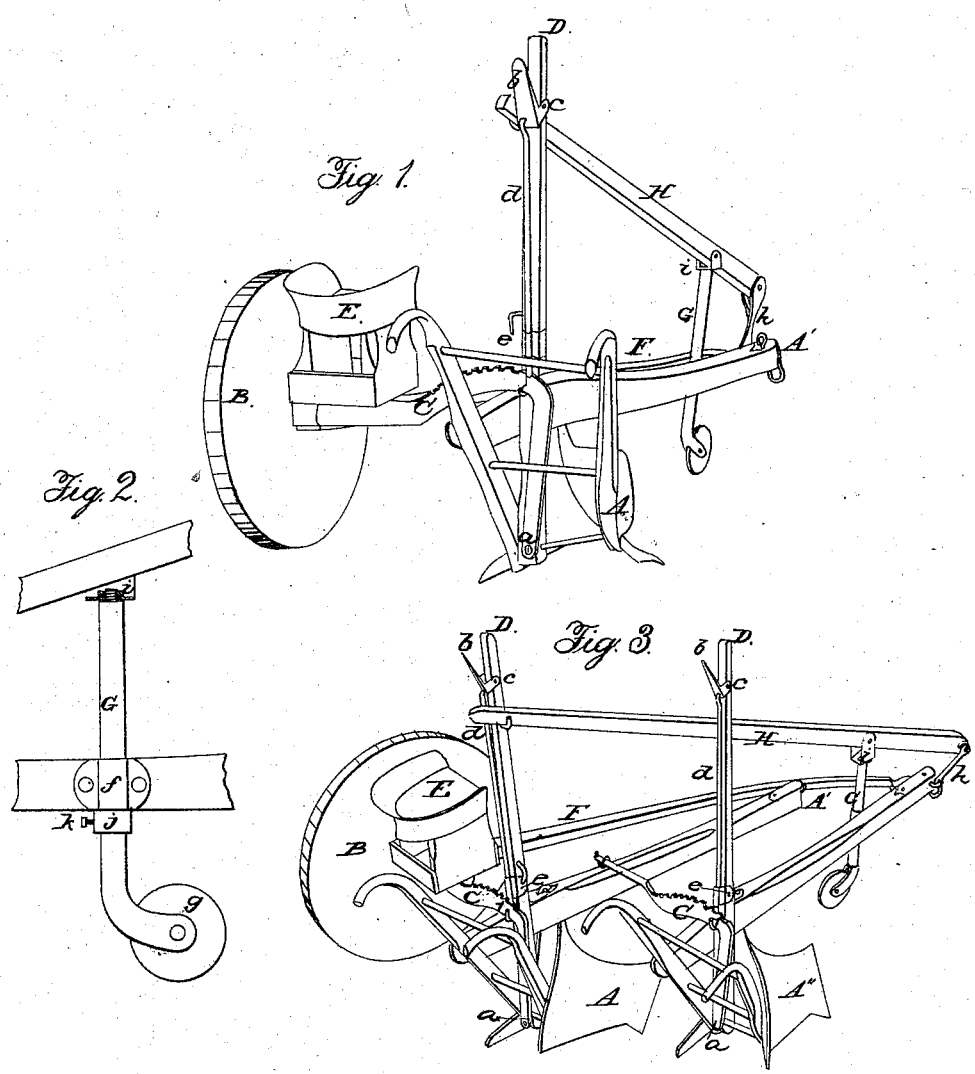

VALENTINE FELKER, OF CARMEL, MAINE.

IMPROVEMENT IN PLOWS.

Specification forming part of Letters Patent No. 48,387, dated June 27, 1865.

*To all whom it may concern:*

Be it known that I, VALENTINE FELKER, of Carmel, in the county of Penobscot and State of Maine, have invented a new and useful Improvement in Plow Holders and Governors; and I do hereby declare that the following is a full, clear, and exact description of the construction and operation of the same, reference being had to the annexed drawings, making a part of this specification, in which—

Figure 1 is a perspective view of the holder and governor attached to the plow. Fig. 2 is a detached perspective view of the governor, and Fig. 3 is a perspective view of a gang of two plows with the holder and governor attached.

This invention consists in connecting any common plow with an ordinary wheel in a peculiar manner, whereby the plow is held and guided in the furrow; also, in a peculiar device for governing the depth of the furrow, and in a combination of two or more plows in gangs held and governed by these devices.

The invention is designed to enable the farmer to dispense with the labor of one person while plowing (the holder) and rendering the labor of plowing an easy task for boys, even, who are of sufficient years to properly guide the team.

To enable those skilled in the art to fully understand and construct my invention, I will proceed to describe its construction and operation.

A, Fig. 1, represents the plow, which may be of any kind or pattern.

B represents the wheel, which should be about three and a half feet in diameter, and may be of any ordinary kind.

C is an elbow, which forms the direct connection between the plow A and the wheel B. This elbow is pivoted at *a* to the upright lever D, while the other end is either formed to pass through the hub of the wheel in the usual form of an iron axle, or it may be secured to a short wooden axle, as the construction of the wheel may require. The upright D is firmly secured to the furrow side of the plow-beam and "land-handle." *b* is a lever-elbow pivoted to the upright D at *c*.

*d* is a rod hinged to the lower end of lever-elbow *b*, held in position near its lower end by box *e*, and formed to catch in the notches in the upper edges of elbow C.

E is the driver's seat.

By pressing the lever-elbow *b* forward against the upright D the rod *d* is drawn upward and disconnected from the elbow C, when by actuating the upright lever D the plow may be canted either to the land or furrow side, as may be desired, to widen or narrow the furrow, when by releasing the lever-elbow *b* the rod *d* drops and catches in the elbow C, holding the plow in the desired position.

F is a rod or guy connecting the end of plow-beam A' with the axle near the wheel.

G is a round iron rod sliding through the box *f*, Fig. 2. This rod is formed at its lower end like the common caster, being curved and forked. In it is pivoted the small wheel or truck *g*.

H is a lever, connected at its forward end to the plow-beam A by the link *h*. The rod G is connected with this lever by the strap *i*, and by depressing the rear end of the lever H the depth of the furrow may be diminished or the plow brought entirely to the surface of the ground. The uniform depth of the furrow is controlled by the collar *j*, Fig. 2, which is formed to move upon the rod G and is held in position by the tightening-screw *k*, while the form of the rod G allows the truck *g* to move at all times in the exact direction of the line of draft, thereby greatly facilitating passing around the head-lands when plowing. The lever H is held in any desired position by means of stops in upright D.

In order to combine two plows in one gang I extend the guy F beyond the end of the beam A' a sufficient distance to enable me to place the plow A'', Fig. 2, on the furrow side of plow A, leaving the width of a furrow between the two plows. The end of the beam of plow A'' connects with the end of guy F, while the plow A connects with the guy at such distance from its end as the distance between the plows renders necessary. The elbow C of plow A'' plays loosely through an eye, *l*, Fig. 3, attached to the beam of plow A, thus allowing plow A'' a free movement laterally for the purpose of turning at the headlands more readily. The governor G and lever H are attached to plow A'', governing the depth of furrow of both plows.

Each plow is actuated independently by means of upright D and its attachments, both plows being perfectly under control, both as regards the depth of furrow or width of the same. The point of contact between rod $d$ and elbow C is shown at $l$.

I do not claim, broadly, a wheel attached to or connected with a plow, so that the plow will be self-holding; nor do I claim, broadly, a plow-governor operated by a lever, whereby the depth of the furrow is determined; but I do claim and desire to secure by Letters Patent—

1. Elbow C, upright D, and lever-elbow $b$, combined and arranged to operate substantially as and for the purpose set forth.

2. Rod G, lever H, truck $g$, and adjustable collar $j$, when arranged and combined to operate substantially as described, whereby the depth of the furrow is not only controlled, but the direction of movement of the truck $g$ always corresponds to the line of draft.

3. The arrangement of the plow-holder as constructed of parts C, D, B, $d$, and $b$, attached to plow A, with plow-governor G, H, $g$, and $j$, operating as described, and for the purposes set forth.

4. The combination of two plows in one gang, when combined and arranged to operate substantially as and for the purposes specified.

VALENTINE FELKER.

Witnesses:
DANIEL SMITH, Jr.,
T. W. PORTER.